No. 776,231. PATENTED NOV. 29, 1904.
A. GATEAU.
VAPOR BURNER.
APPLICATION FILED NOV. 5, 1903.
NO MODEL.
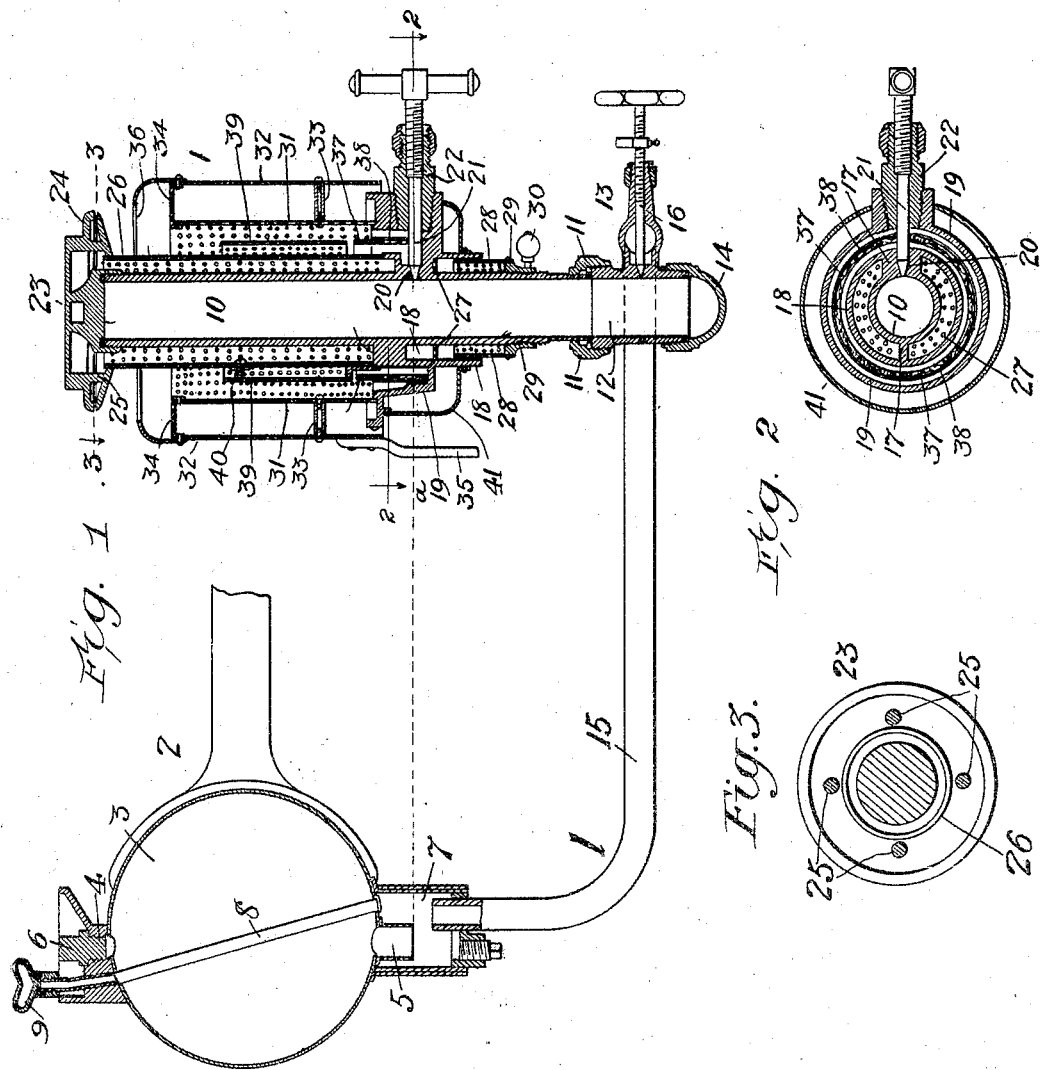
Witnesses:
Inventor:
Antoine Gateau
By
Atty.

No. 776,231. Patented November 29, 1904.

UNITED STATES PATENT OFFICE.

ANTOINE GATEAU, OF CHICAGO, ILLINOIS.

VAPOR-BURNER.

SPECIFICATION forming part of Letters Patent No. 776,231, dated November 29, 1904.

Application filed November 5, 1903. Serial No. 179,876. (No model.)

*To all whom it may concern:*

Be it known that I, ANTOINE GATEAU, a citizen of the Republic of France, residing at Chicago, in the county of Cook and State of Illinois, have invented certain new and useful Improvements in Vapor-Burners, of which the following is a specification.

The object of this invention is the production of an improved apparatus for vaporizing and burning kerosene for heating, cooking, and other purposes.

Figure 1 of the accompanying drawings is a vertical central section through a burner and oil-reservoir embodying the features of my invention, said burner and reservoir being shown apart from the stove-body or other construction with which they may be associated in use. Fig. 2 is a horizontal section through the burner on dotted line 2 2 of Fig. 1. Fig. 3 is a horizontal section through the spreader on dotted line 3 3 of Fig. 1.

In the drawings, 1 refers to the burner proper, and 2 to the reservoir for the fuel-oil. This reservoir is arranged to maintain the oil in the burner at a constant level regardless of the level of the oil in the reservoir. Said reservoir comprises a suitable vessel 3, closed save for a filling-opening 4 at its upper end and a discharge-opening 5 at its lower end, a screw-stopper 6 being provided for said filling-opening. At the lower end of the vessel 3 is a chamber 7, into which the discharge-opening 5 delivers the oil. The chamber 7 is placed in communication with the atmosphere by means of a tube 8, extending from said chamber through the vessel 3 to a point a little above the upper end of said vessel and being there provided with a valve 9 for closing said tube.

The burner 1 comprises a vertical tube 10, connected at its lower end, by means of the union 11, with a casting consisting of a short tube 12 and a valve-casing 13. The lower end of the tube 12 is closed by a screw-cap 14. A pipe 15 communicates between the chamber 7 of the reservoir 2 and the valve-casing 13, a valve 16 in said casing controlling the admission of oil to the tube 10.

Surrounding the tube 10 and supported therefrom by means of radial arms 17 is a sleeve 18, forming part of a cup 19, said tube, sleeve, and cup being integral one with the other. A duct 20, connecting the interior of the tube 10 with the interior of the cup 19, is arranged to be opened or closed by means of a valve 21, the stem of which valve lies within a valve-casing 22 at one side of the cup 19. At the upper end of the tube 10 and closing the same is a chambered spreader 23, provided in its periphery with a narrow discharge-opening 24. Studs 25 connect the upper and lower parts of said spreader together. A perforated tube 26 extends from within the spreader 23 to the upper end of the sleeve 18. A perforated diaphragm 27, in ring form, is frictionally supported between the sleeve 18 and the tube 10. In the operation of the burner air passes upward in the space between the tube 10 and the sleeve 18 and tube 26 into the chambered spreader 23, escaping through the peripheral opening 24 in said spreader. Telescoping with the sleeve 18 is a perforated tube 28, supported upon a ring 29, said ring having a screw-thread engagement with the tube 10 in order to permit of moving the tube 28 up or down with reference to the sleeve 18, and thus regulating the admission of air to the space between said sleeve and the tube 10. A button 30 is provided for turning the ring 29 upon its screw-threads.

The cup 19 supports a perforated tube 31, and the latter in turn supports an outer casing 32 by means of arms 33 and a flange 34 on said casing, said flange being perforated. The tube 31 and casing 32 rest loosely upon the cup 19 and may be lifted therefrom by means of a handle 35, fixed to the lower edge of said casing. In the upper end of the casing 32, beneath the spreader 23, is an opening 36. Within the cup 19 and between the sleeve 18 and the tube 31 is a tubular wick 37, said wick being supported in an upright position by means of a ring 38. The space between the tubes 26 and 31 is divided by a perforated tube 39, supported from the tube 26 by means of one or more rivets 40. A jacket 41, secured in any suitable way to the cup 19 and the sleeve 18, prevents radiation of heat from said cup.

While filling the reservoir 2 the tube 8 is kept closed by means of the valve 9 and the tube 10 is closed by the valve 16. Oil admitted to the vessel 3 through the filling-opening 4 fills said vessel, the chamber 7, and the pipe 15.

When it is desired to use the burner, the valves 9, 16, and 21 are opened, whereupon the oil rises in the tube 10 to the plane of the line a, Fig. 1, some of the oil flowing through the duct 20 into the cup 19. Raising the tube 31 and the casing 32 by the handle 35, the wick 37 is now lighted. The heat generated by the combustion of the oil in the cup 19 raises said cup and the tube 10 to such a temperature as to vaporize a portion of the oil within the tube 10. The pressure of the vapor within the upper end of the tube forces the oil downward in said tube, uncovering the duct 20, through which duct the vapor escapes into the space between the tubes 26 and 31. From this space the vapor issues through the opening 36 and mingles with the heated air flowing from the peripheral opening 24 in the spreader 23. The combustible mixture thus obtained burns around the spreader, keeping the burner in a highly-heated condition and continuing the generation of gas. The burner may be extinguished by closing the valve 16.

My invention is not restricted to the precise construction and arrangement of parts herein shown and described, as such construction and arrangement may be varied or modified without departing from the spirit and scope of the invention.

I claim as my invention—

1. In a vapor-burner, in combination, a closed tube having an inlet in its lower portion and an outlet above said inlet, said tube constituting a vaporizing-chamber; a spreader having an air-discharge opening therein; an air-tube for conducting air to the interior of the spreader; and means for directing vapor issuing from the outlet of said first-mentioned tube to a point near said spreader.

2. In a vapor-burner, in combination, a closed tube having an inlet and an outlet, said tube constituting a vaporizing-chamber; a spreader having an air-discharge opening therein; an air-tube for conducting air to the interior of said spreader; adjustable means for controlling the admission of air to said air-tube; and means for directing vapor issuing from the outlet of said closed tube to a point near said spreader.

3. In a vapor-burner, in combination, a closed tube having an inlet and an outlet, said tube constituting a vaporizing-chamber; a chambered spreader having an air-discharge opening therein; a perforated tube providing an air-passage, which passage is adapted to communicate with the interior of said spreader; and a perforated tube for directing vapor issuing from the outlet of said first-mentioned tube to a point near said spreader.

4. In a vapor-burner, in combination, a vaporizing-chamber having an inlet and an outlet; a tube surrounding said chamber and providing an air-passage between said chamber and said tube; a chambered spreader having a discharge-opening therein, into which spreader said tube is arranged to deliver air; and means for directing the vapor issuing from the outlet of the vaporizing-chamber to a point near said spreader.

5. In a vapor-burner, in combination, a vaporizing-chamber having an inlet and an outlet; a tube surrounding said chamber and providing an air-passage between said chamber and said tube; a chambered spreader having a discharge-opening therein, into which spreader said tube is arranged to deliver air; and a tube surrounding said first-mentioned tubes and providing a space between them with which the outlet from said vaporizing-chamber is arranged to communicate.

6. In a vapor-burner, in combination, a vaporizing-chamber having an inlet and an outlet; a cup surrounding said chamber; a chambered spreader having a discharge-opening therein; a tube supported by said cup and providing an air-passage adapted to communicate with the interior of said spreader; and means for directing the vapor issuing from the outlet of the vaporizing-chamber to a point near said spreader.

7. In a vapor-burner, in combination, a vertical closed tube having an inlet in its lower portion and an outlet above said inlet, said tube constituting a vaporizing-chamber; a cup surrounding said tube, the interior of which cup is arranged to communicate with the outlet of said tube; a spreader having an air-discharge opening therein; a tube for conducting air to said spreader; and means for directing vapor issuing from the outlet of said vertical tube to a point near said spreader.

8. In a vapor-burner, in combination, a closed tube having an inlet and an outlet; a cup surrounding said tube; a chambered spreader at one end of said tube having an air-discharge opening therein; a tube supported by said cup, surrounding said first-mentioned tube and providing an air-passage between them, said passage communicating with the interior of said spreader; and means supported by said cup for directing vapor issuing from the outlet of said closed tube to a point near said spreader.

9. In a vapor-burner, in combination, a vertical central closed tube having an inlet and an outlet; a cup surrounding said central tube; a chambered spreader at the upper end of said tube having an air-discharge opening therein; a tube supported by said cup and providing an air-passage, which passage is adapted to communicate with the interior of said spreader; and means supported by said cup for directing vapor issuing from the outlet of said central tube to a point near said spreader.

10. In a vapor-burner, in combination, a vertical closed tube having an inlet in its lower portion and an outlet above said inlet; a cup surrounding said tube, the interior of which cup is arranged to communicate with the outlet of said tube; a chambered spreader having an air-discharge opening therein; a tube surrounding said vertical tube for conducting air to said spreader; and a tube surrounding the two first-mentioned tubes for directing vapor issuing from the outlet of said vertical tube to a point near said spreader.

11. In a vapor-burner, in combination, a vertical closed tube having an inlet in its lower portion and an outlet above said inlet; a cup surrounding said tube, the interior of which cup is arranged to communicate with the outlet of said tube; a chambered spreader at the upper end of said closed tube having an air-discharge opening therein; a perforated tube surrounding said closed tube for conducting air to said spreader; and means for directing vapor issuing from the outlet of said closed tube to a point near said spreader.

12. In a vapor-burner, in combination, a vertical closed tube having an inlet in its lower portion and an outlet above said inlet; a cup surrounding said tube, the interior of which cup is arranged to communicate with the outlet of said tube; a chambered spreader at the upper end of said closed tube having an air-discharge opening therein; a perforated tube surrounding said closed tube for conducting air to said spreader; adjustable means for controlling the admission of air to said perforated tube; and a perforated tube surrounding said first-mentioned tubes for directing vapor issuing from the outlet of said closed tube to a point near said spreader.

ANTOINE GATEAU.

Witnesses:
H. M. McDonell,
L. M. Hopkins.